United States Patent [19]

Szeto et al.

[11] Patent Number: 4,837,807
[45] Date of Patent: Jun. 6, 1989

[54] STATION TO STATION MESSAGE ARRANGEMENT

[75] Inventors: Rickens T. Szeto, Tinton Falls; Harold K. Woodland, Lakewood, both of N.J.

[73] Assignees: American Telephone and Telegraph Company, New York, N.Y.; AT&T Information Services Inc., Morristown, N.J.

[21] Appl. No.: 139,874

[22] Filed: Dec. 30, 1987

[51] Int. Cl.⁴ ............... H04M 1/02; H04M 11/00
[52] U.S. Cl. ............................ 379/96; 379/93; 379/210
[58] Field of Search ........... 379/93, 94, 95, 96, 379/210

[56] References Cited

U.S. PATENT DOCUMENTS

| | | | |
|---|---|---|---|
| 4,075,426 | 2/1978 | Gould | 379/100 |
| 4,223,183 | 9/1980 | Peters, Jr. | 379/96 |
| 4,291,198 | 9/1981 | Anderson et al. | 379/96 |
| 4,380,009 | 4/1983 | Long et al. | 340/825.55 |
| 4,381,505 | 4/1983 | Dion | 340/756 |
| 4,406,925 | 9/1983 | Jordan et al. | 379/93 |
| 4,529,841 | 7/1985 | Andersson et al. | 379/213 |
| 4,660,031 | 4/1987 | Buchas | 340/792 |

FOREIGN PATENT DOCUMENTS 0195060  8/1986  Japan ..................... 379/96

OTHER PUBLICATIONS

P. Zinsli, "The Messaging Telephone in the Integrated Office", *Telecommunications*, Sep. 1984, pp. 74 and 80.
Escom, "The Evolution of Office Communication", May 1987.
Hagelbarger et al, "Experimental Teleterminals–Hardware", *The Bell System Technical Journal*, vol. 62, No. 1, Jan. 1983, pp. 145–152.
Bayer et al, "An Experimental Teleterminal–Software", The Bell Technical Journal, vol. 62, No. 1, Jan. 1983, pp. 121–144.

*Primary Examiner*—Jin F. Ng
*Assistant Examiner*—Wing F. Chan
*Attorney, Agent, or Firm*—Frederick B. Luludis

[57] ABSTRACT

A business communication system serving a plurality of telephone station sets is provided with a station-to-station messaging facility integrated therewith. The operation of the station-to-station messaging facility is invoked when a user at a station set enters a respective feature code. Thereafter, responsive to a series of prompts, the user enters a code identifying the predefined textual message that he/she desired to send and enters the identity (telephone number) of the receiving station, the receiving station being one that is equipped with a display. The station-to-station messaging facility responsive thereto translates the code into its respective predefined message and sends the message with the identity of the sending station to the receiving station for display thereat.

12 Claims, 7 Drawing Sheets

| STATION TO STATION MESSAGES ||
|---|---|
| MESSAGE NUMBER | MESSAGE |
| 01 | GO TO LUNCH |
| ⋮ | |
| 12 | COFFEE BREAK |
| ⋮ | |
| 55 | GO HOME |
| ⋮ | |
| 90 | PLEASE CALL YOUR SUPERVISOR |

|   | DATE | TIME | SENDER | MESSAGE NUMBER |
|---|------|------|--------|----------------|
| 1 | 12-12 | 10:05AM | 3301 | 90 |
| 2 | 12-12 | 11:15AM | 3276 | 56 |
| 3 |      |      |        |                |
| 4 |      |      |        |                |
| ⋮ |      |      |        |                |
| 15 |     |      |        |                |

STATION TO STATION MESSAGE ARRANGEMENT

FIELD OF THE INVENTION

The invention relates to business communication systems and more particularly to a station-to-station message arrangement for use in such systems.

BACKGROUND OF THE INVENTION

In a digital business communication system, so-called electronic mail may be used to send a textual message from one system terminal to another system terminal, a terminal being, for example, a personal computer, which displays the message on its screen responsive to a request from a user. However, no arrangement is presently available which allows a user at a system telephone station set to send to another system telephone station set having a display a textual message for display at the latter station.

SUMMARY OF THE INVENTION

The limitation discussed above is obviated by providing a station-to-station messaging arrangement for use in a business communication system which allows a system station set to send, in accordance with the invention, one of a plurality of predefined textual message to a system station equipped with a display.

In particular, a user at a station set (sender) and desiring to send to another user at a station set equipped with a display (receiver) a predefined message may do so by entering via the station key pad (a) a feature code identifying the station messaging arrangement, (b) the code of the particular message that is to be sent to the receiver, and (c) the identity (telephone number) of the receiver. Thereafter, the message code is translated into a respective predefined message which is then stored in a buffer reserved for the receiver and sent to the receiver for display thereat.

As an aspect of the invention, a predefined message sent to one of a predetermined group of station sets each equipped with a display is displayed at each station of the group, the group being a so-called hunt group.

SYSTEM OVERVIEW

Figure 1:
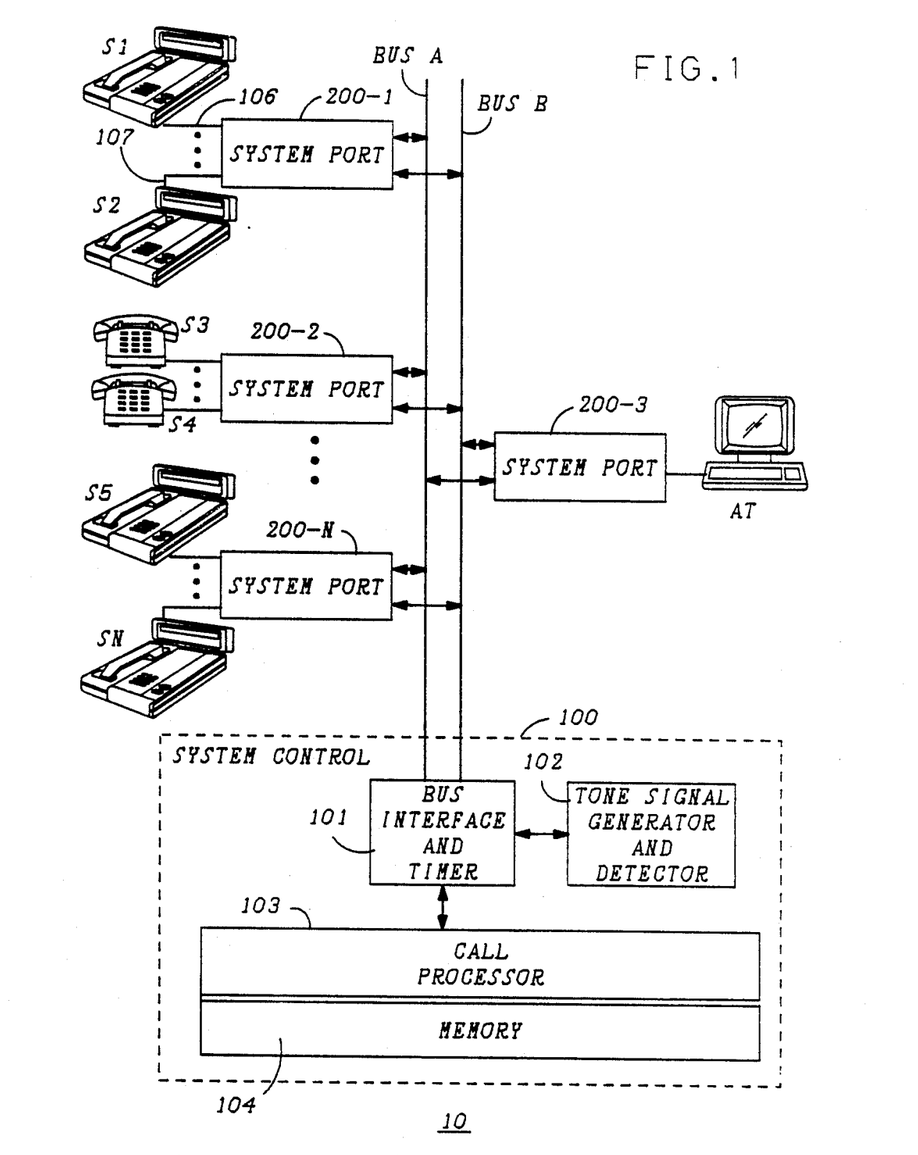
FIG. 1 is a block diagram of a business communication system in which the invention is advantageously used.

FIG. 1 shows a block diagram of a stored-program-controlled business customer communication system 10 which combines the usual features with the present invention. Control is distributed among a plurality of system ports 200-1 through 200-N, with each system port, such as system port 200-1, serving a number of terminals, such as telephone station sets S1 and S2. The system ports, in turn, are served by a digital bus system having bus A and bus B and a common system control 100. Common system control 100 includes, inter alia, bus interface and timer 101, call processor 103, and tone signal generator and detector 102. System bus A and system bus B are time division multiplexed busses, each having 256 time slots. The manner in which these elements operate is disclosed in U.S. Pat. No. 4,389,720 issued to L. A. Baxter et al, which is hereby incorporated by reference. Briefly, the system shown handles voice signals, as well as data, between the various stations. Tone signal generator and detector 102 detects digit tones generated by a station set, such as station S1. Tone signal generator and detector 102 also generates the various call progress tones and digit tones required in the operation of system 10. Processor 103 provides control information to the system ports indicative of the time slots assigned to a particular station, as discussed in the aforementioned L. A. Baxter et al patent.

Associated with call processor 103 is memory 104 in which is stored the program which directs the operation of the system. Memory 104 also contains records associated with each station, such as station S1. Stimuli, such as digit tones and supervisory signals, received from station S1 are stored in its assigned station record. The station record is used by processor 103, operating in conjunction with the stored program, to track the functional status of station S1 upon receiving a new stimuli therefrom.

Figure 2:
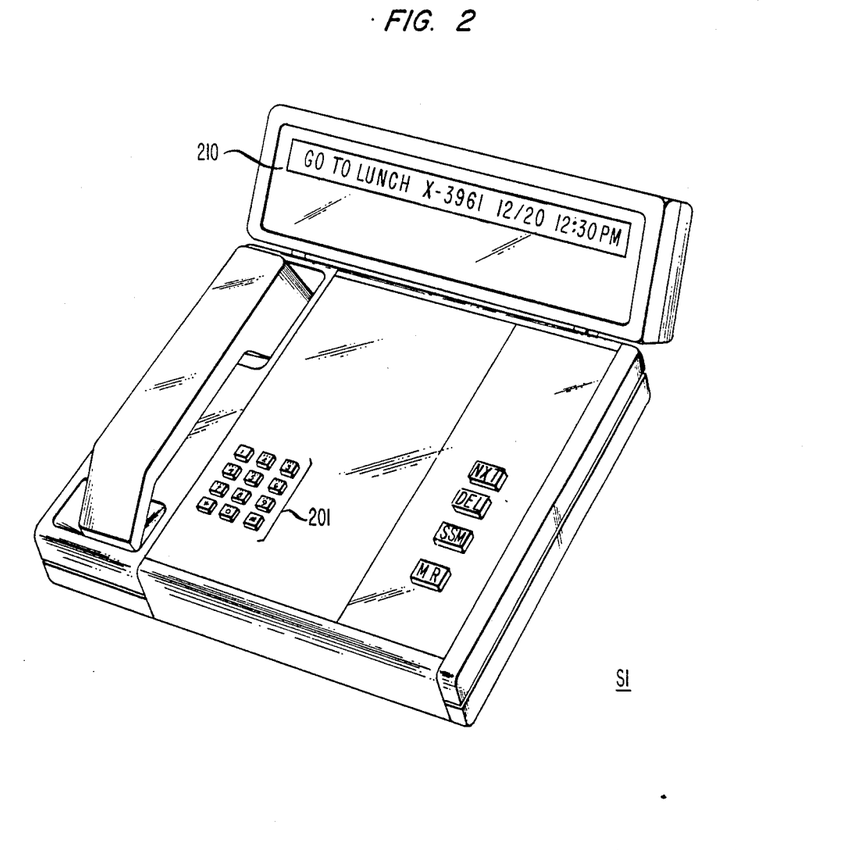
FIG. 2 is a drawing of a station set with a display module attached, that is illustratively used in the system of FIG. 1.

Station S1 shown in FIG. 1 has been expanded in FIG. 2 to show the station elements more clearly. Keypad 201 is a telephone keypad having a plurality of buttons for generating coded signals representative of digits 1 to 0, the asterisk (*) and the pound sign (#). Also associated with station S1 is display module 210 capable of displaying—illustratively 40 characters, such as the name and telephone number of a calling station, received from associated port 200-1. Station S1 is of the type disclosed in U.S. Pat. No. 4,512,017 to Nici et al, which is hereby incorporated by reference.

Station S1 also includes at least the standard repertoire of feature buttons for invoking station features, such as "hold", "conference", etc. (not shown in FIG. 2). Also included in the array of feature buttons is the station-to-station message button "SSM", which may be used for invoking the invention claimed herein. FIG. 2 also shows a station-to-station message retrieval "MR" button, a "NXT" button and a message delete button "DEL". The MR button allows a user to request a display of stored messages; the NXT button allows the user to display the next message stored in the respective message buffer; and the DEL button allows the user to delete a displayed message from the message buffer, as will be discussed below.

SYSTEM DETAILS

Figure 3:
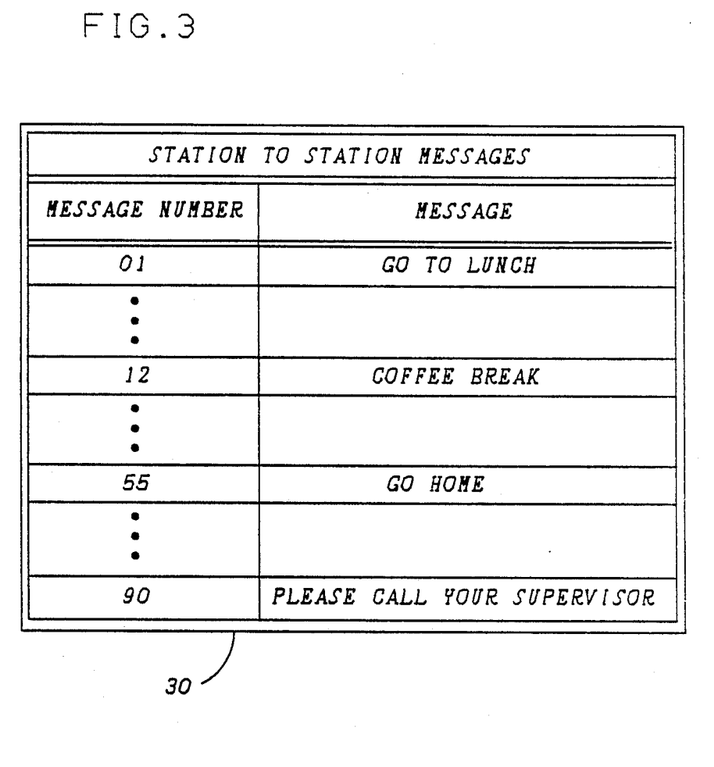
FIG. 3 shows the layout of a message table stored within the communication system of FIG. 1, the table having a plurality of predefined messages and respective codes.

Referring now to FIG. 3, there is shown a table 30 of predetermined message codes 01 through 90 and associated predefined messages. Table 30, which is stored in memory 104, is used by processor 103 to translate a message code, for example the code 01, into its respective message. The various messages shown in table 30 may be prepared by an administrator of system 10 to meet the needs of the business which system 10 serves. The number of predefined messages stored in table 30 is only limited by those needs and the size of memory 104. Thus, the number of messages and respective codes entered in table 30 could be either less than or more than 90.

When system 10 is first brought on line, a sample of factory customized messages and respective codes could be stored in table 30. Thereafter, the administrator may enter different personalized messages and respective codes, one at a time, via the administration terminal AT keyboard (FIG. 1). (The use of an administration terminal, such as terminal AT, in a business communication system is well-known and will not be discussed herein. However, it suffices to say that an administration terminal is used, inter alia, for installing, rearranging, and changing equipment and services as well as so-called system feature options. It is also used to modify data in the system's translation database.) Entry of a personalized message with a code that is already stored in table 30 overwrites the respective prior message. Thus, the administrator may replace a message in table 30 by entering the code of the old message with the new message. Processor 103 responsive thereto, searches table 30 for the code that it received from terminal AT. When processor 103 finds the code, it replaces the message in the table with the newly inputted message.

A user positioned at a system station set, for example, station set S3, which is a conventional business station set not equipped with a display, may, nevertheless, in accordance with the invention, cause one of the messages contained in table 30 to be sent to another station set equipped with a display, such as, for example station S1.

Specifically, in order to send such a message, the user at station S3 causes the station to go off-hook in the conventional fashion, i.e., by removing the station handset from the station cradle. System port 200-2 responsive to the station S3 off-hook sends a message containing, inter alia, the identity of station S3 and the current status, i.e., off-hook, of that station to processor 103 via system bus A or B. The manner in which a system port communicates with processor 103 is discussed in U.S. Pat. No. 4,511,969 to M. J. Koenig et al, which is hereby incorporated by reference. Processor 103 responsive to the notification returns dial tone generated by tone signal generator and detector circuit 102 to station S3 via system bus A or B and port 200-2. The user at station S3 responsive to receipt of dial tone enters the code identifying the station-to-station message feature using the station S3 keypad. A feature code may be represented by, for example, either a number or the asterisk (*) or pound (#) sign followed by a number, such as codes 76, *76 or #76.

Processor 103 responsive to receipt of the feature code, for example, the code *76, invokes a station-to-station feature program (hereinafter SSM program), which is stored in memory 104 and which is designed to process a station-to-station request. When the SSM program is entered it causes dial tone to be returned to station S3. The application of dial tone in this instance is used to prompt the user at station S3 to enter the code of the message that he/she wishes to send. When the user enters the digits of the desired code, for example, the digits 01 representing the message "GO TO LUNCH", the SSM program stores the code and identity of station S3 in a memory register. The SSM program, as will be discussed below, checks the code to determine its validity. Assuming that the code is valid, the SSM program again causes dial tone to be supplied to station S3 as a means of prompting the user thereat to enter the identity (telephone number) of the recipient of the message. In the present illustrative example of the invention, it is assumed that station S3 is sending the message to station S1 whose telephone number is, for example, 3231. When the SSM program receives the telephone number of station S1, the program stores the number in the aforementioned register and "checks" to see if station S1 is equipped with a display. If station S1 is not so equipped, then the program returns an error signal to station S3, the error signal being, for example, so-called intercept tone.

Otherwise, the program addresses table 30 using the code received from station S3 as an index to retrieve the respective message. The program then sends the retrieved message together with the identity of station S3 and the current time and date to station S1 for display thereat, as shown in FIG. 2. Upon completing this task, the program then returns an alerting signal, such as, for example, confirmation tone, which indicates that the message was sent successfully, followed by dial tone, to station S3 as an indication that the program is ready to accept another message request from station S3. The user thereat may then enter the code of the next message that the user desires to send and the identity of the receiver when prompted to do so, as discussed above. If the user is not so disposed then he/she may terminate the connection to the station-to-station feature program by causing station S3 to go on hook, i.e., by placing the handset in the station S3 cradle.

A business communication system typically employs what is commonly referred to as a station hunt group. A station hunt group is a group of station sets assigned to a particular department of a business in which an incoming call to the department may be connected to any idle station set of the hunt group, i.e., a station that is on-hook. For example, an airline typically arranges its ticket reservation department into at least one hunt group. A prospective subscriber who dials the telephone number of the reservation department is then connected to the first idle station set of the hunt group. In addition, a call connection may be established to a particular station of a hunt group by dialing the telephone number assigned to the station, rather than the telephone number assigned to the hunt group. Accordingly, a user at a system station, for example, station S1, may, in accordance with an aspect of the invention, send one of the messages in table 30 to an individual station of a hunt group by entering the telephone number of that station or to each station of the hunt group by entering the telephone number assigned to the hunt group.

Specifically, a user at station S1 may cause processor 103 to invoke the SSM program by entering the aforementioned feature code using the station S1 keypad, as discussed above. Alternatively, the user may request the feature by operating the SSM feature button shown in FIG. 2. In the latter instance, station S1 sends the code assigned to that button to processor 103 via system port 200-1 and system bus A or B. Processor 103 responsive to receipt of the button code, translates the code into the SSM feature code and enters the SSM program to respond to the feature request.

It is assumed at this point that the user at station S1 responsive to receipt of the aforementioned prompts has entered the code of the table 30 message that he/she desires to send and the telephone number of the hunt group, the hunt group comprising, for example, stations S5 through SN and the telephone number of the hunt group being, for example, the number 4400. As before, the SSM program upon receipt of the telephone number checks its validity and in doing so notes that the number is assigned to a hunt group. It is noted that there is stored in memory 104 for each such hunt group a telephone number record containing the telephone numbers of the respective stations in the group, i.e., the telephone numbers of stations S5 through SN.

To send the message to each station of the hunt group, the SSM program appends the senders telephone number (e.g., the number 3231) and the current time and date to the message of the code entered by the user at station S1 to form the personalized message, the program then sends the personalized message to the first station identified in the hunt group telephone number record, the first station being, for example, station S5. The SSM program then sends the personalized message to the next telephone station identified in the record, and so on. Accordingly, each hunt-group station equipped with a display receives the same message at substantially the same time.

Over the course of a business day it is likely that a station set user for example, the user at station S1, could be away from his/her desk for period of time over which a number of messages are sent to station S1. In such an instance, the first of such messages would be displayed on the display of station S1. However, a problem arises in the event that a second message is sent to station S1 before the user has had an opportunity to view the displayed message, since the second message would overwrite the displayed message.

This program is handled by storing messages sent to a station, for example, station S1, in a respective message buffer. The user at station S1 may thereafter request a display of the messages stored in the station S1 buffer by operating the NXT button and may delete a message from buffer at the time that it is displayed by operating the DEL button on station S1. A displayed message that is not deleted is saved in the buffer.

Figure 4:
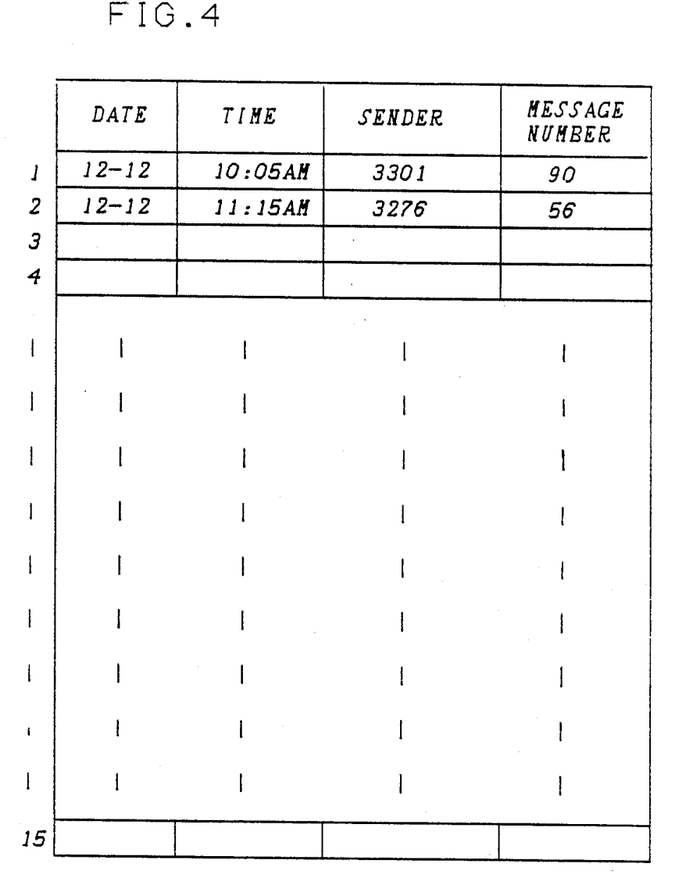
FIG. 4 shows the layout of a message buffer associated with a respective telephone station set.

Turning now to FIG. 4, there is shown a layout of a message buffer comprising a number of message records—illustratively 15—designated 1 through 15. A message buffer is reserved in memory 104 for each system 10 station that is equipped with a display, such as, for example, station S1. It is seen from FIG. 4 that each station message record consists of four fields of information: message code, sender, time and date, which coincides somewhat with the format of a message sent to a station for display.

To display a stored message at a station set, for example, station S1, the user thereat operates the message request (MR) button on station S1. The SSM program responsive thereto searches the respective message buffer to locate the latest message stored therein. When the program "finds" the latest message it translates the code stored in the code field into the respective predefined message and sends the predefined message to station S1 together with the other fields of the record for display. The user may then cause the next latest record stored in the respective buffer to be displayed at station S1 by operating the NXT button on station S1. Thus, the user at station S1 may cause each message stored in the respective buffer to be displayed at station S1 by operating the NXT button following the display of a stored message.

In addition, the user at station S1 may delete a message from the respective message buffer by operating the DEL key at the time that the message is being displayed at station S1, as mentioned above. The SSM program responsive thereto clears the message record bearing the displayed message, thereby making that location available for the storage of a subsequent message sent to station S1.

We turn now to a discussion of the software that implements the invention, namely, the SSM program.

Figure 5:
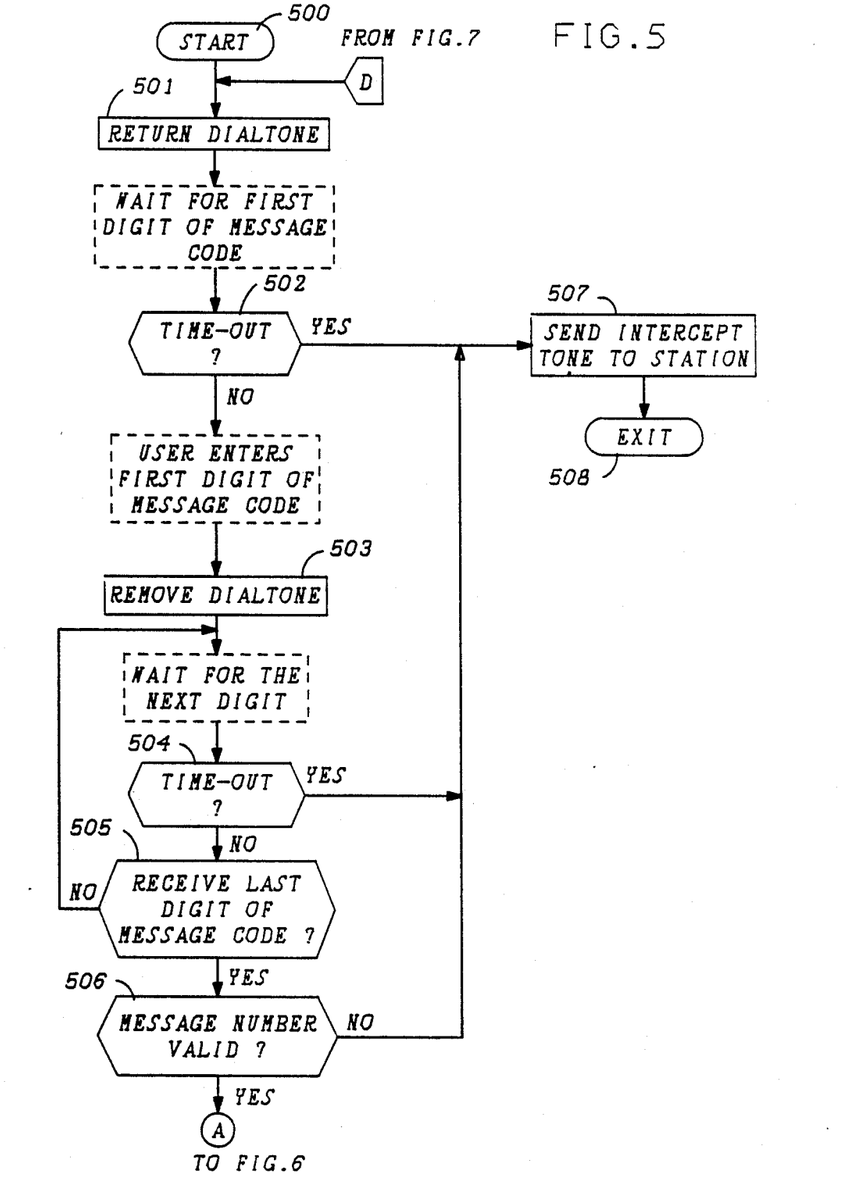
FIGS. 5-7 are flow charts detailing the operation within the system of FIG. 1 of a station-to-station message program embodying the principle of the invention.
Figure 6:
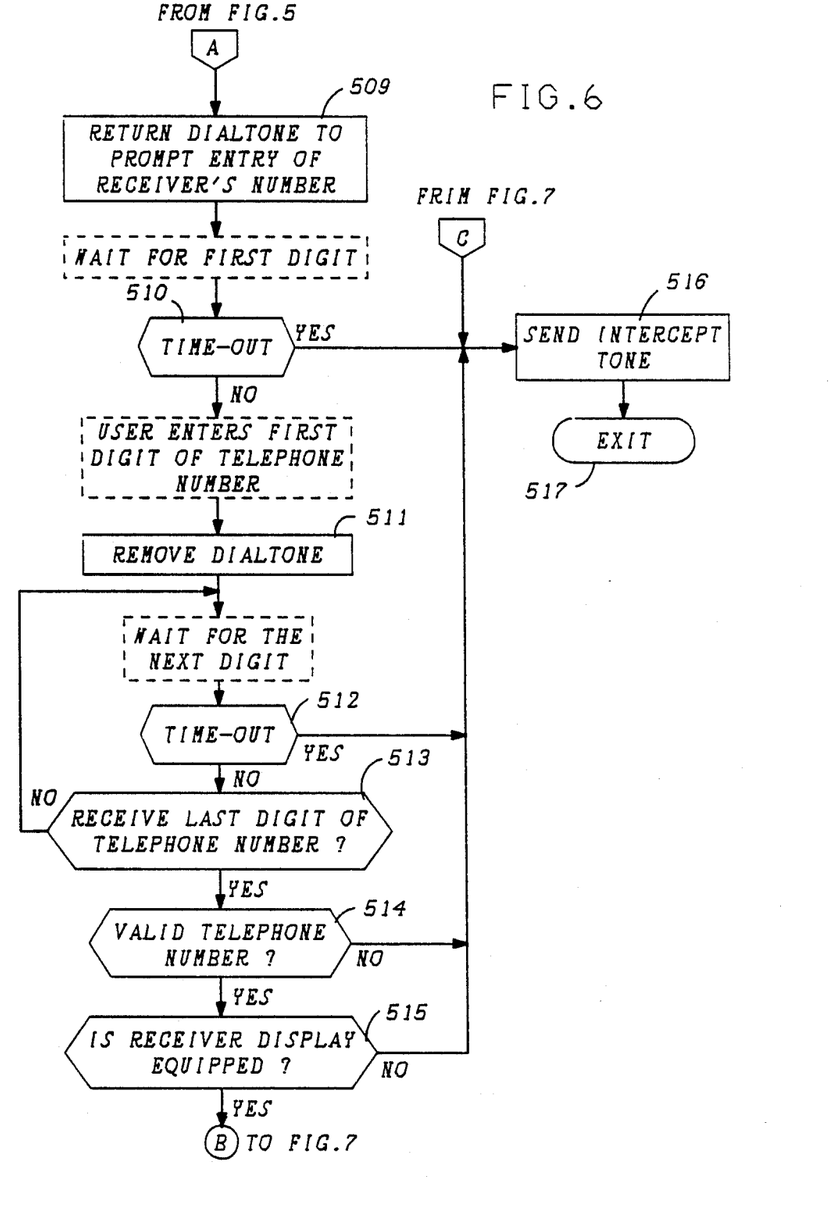
Figure 7:
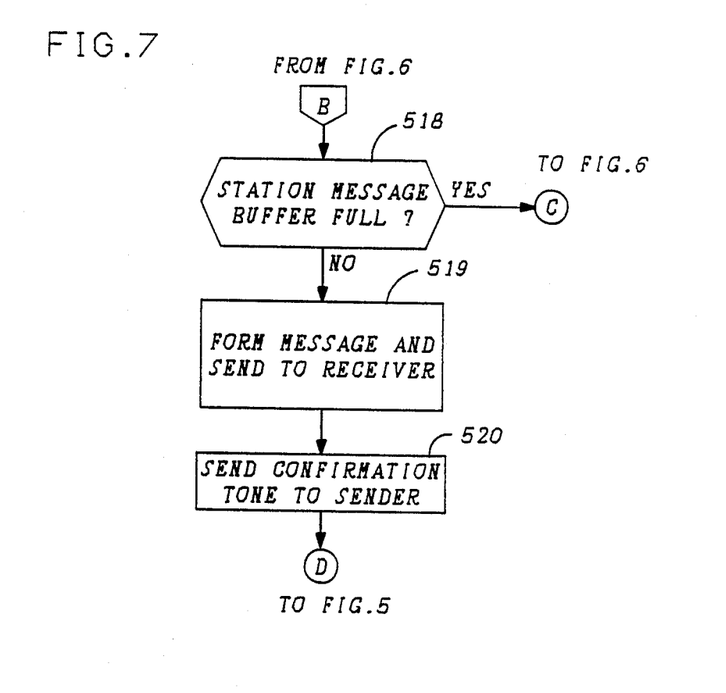
Figure 8:
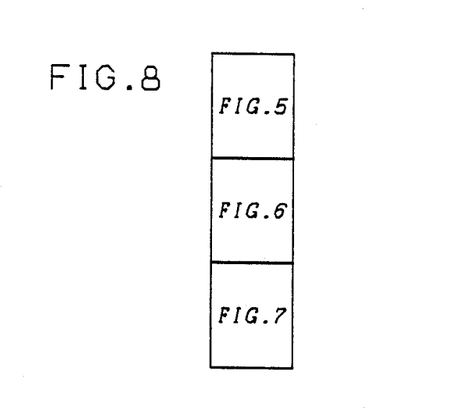
FIG. 8 shows the manner in which FIGS. 5-7 should be arranged.

Specifically, and referring now to FIGS. 5–7, which should be arranged as shown in FIG. 8, there is shown a simplified flowchart of the SSM program when it is invoked as a result of processor 103 receiving the program feature code. When the program is entered at block 500, it proceeds to block 501 where it returns dial tone to the station which requested the feature. The program then waits for the user to enter the first digit of the code of the message that he/she desires to send. If the program does not receive the digit within a predetermined period of time—illustratively 10 seconds—as represented by block 502, then the program proceeds to block 507 where it returns an error signal, for example, so-called intercept tone, to the user's station. The program then exits via block 508. Otherwise, the program proceeds to block 503 to cause the sending of dial tone to the station to be terminated. The program then proceeds to block 504 to wait for the user to enter the next digit of the code.

If the program does not receive the next digit within 10 seconds then it exits via block 508, as discussed above. However, if the program receives the next digit within the prescribed period, it then proceeds to block 505 to determine if it has received the last digit of the code. If the determination at block 505 turns out to be yes, then the program proceeds to block 506 to determine the validity of code. If the determination at block 505, on the other hand, turns out to be no, then the program proceeds to block 504 to await receipt of the next digit of the code.

At block 506 the program checks the code entered by the user to see if the code is contained in table 30. If the code is contained in table 30, the program then checks to see if an associated predefined message is stored with the code. The program proceeds to block 507 if it find that either the code or associated predefined message is not contained in table 30. If the code and predefined message are contained in table 30, then the program proceeds to block 509.

At block 509 the program causes dial tone to be returned to the sending station to prompt the user thereat to enter the identity (telephone number) of the station that is to receive the predefined message. The program then proceeds to block 510, where it waits for the user to enter the first digit of the receiver's telephone number. If the program does not receive the digit within—illustratively 10 seconds—it then proceeds to block 516 to cause the aforementioned error signal to be returned to the station set. The program then exits via block 517.

If the program receives the digit within the prescribed period of time, it then proceeds to block 511. The program at 511, causes the sending of dial tone to the sending station to be terminated. When the program completes that task, it then proceeds to block 512 to wait for the user to enter the next digit of the receiver's telephone number. As before, the program at block 512 waits—illustratively 10 seconds—for the user to enter the next digit. If the user fails to do so, then program proceeds to block 516. Otherwise, the program proceeds to block 513 to determine if it has received the last digit of the telephone number. If the program finds that it has received the last digit it then proceeds to block 514. Otherwise, the program returns to block 512 to await the entry of the next digit.

At block 514, the program checks the validity of the telephone number entered by the user, i.e., that the telephone number has been assigned to a station set served by system 10. If the program finds that to be the case, it then proceeds to block 515 to determine if the station set identified by the telephone number is equipped with a display. Otherwise, the program proceeds to block 516 to return the aforementioned error tone to the user.

At block 515, the program proceeds to block 516 if it finds that the receiving station is not equipped with a display. Otherwise, it proceeds to block 518. At block 518, the program checks to see if the receiving station's message buffer is full. If the program finds that to be the case, then the program proceeds to block 516 to alert the user (sender) of that fact. Otherwise the program proceeds to block 519. At block 519, the program formats the display message using the message code, date and time, and the identity of the sender. The program then loads the display message into an available location in the receiving station's message buffer. The program then translates the code entered by the user into the respective predefined message and substitutes the latter for the code in the message to form the personalized message. The program then sends the personalized message to the receiver. The program then proceeds to block 520 after completing this task. At block 520, the program causes a so-called confirmation tone to be returned to the user as an indication that the predefined message has been sent to the receiving station. The program then proceeds to block 501 to receive entry of the next message that the user desires to send. It is noted that the user may terminate the session at this point by going on-hook at his/her station set, i.e., by placing the telephone handset in the station set cradle.

The foregoing is merely illustrative of the principles of our invention. Those skilled in the art will be able to devise numerous arrangements which, although not explicitly shown or described herein, embody those principles and are within its spirit and scope. For example, the aforementioned code, rather than being used to identify a predefined textual message, could be used to identify a respective prerecorded message. Thus, a prerecorded audio message could be sent to a station, rather than a predefined textual message.

What is claimed is:

1. In a business communication system serving a plurality of telephone station sets identified by respective telephone numbers, a station-to-station messaging arrangement for sending a textual message from one of said telephone station sets to any other one of said telephone station sets, individual ones of said telephone station sets being equipped with a display, said arrangement comprising, means responsive to a predetermined request inputted by a user at one of said station sets for returning to said one station set signals prompting said user to enter a predetermined code representative of a predefined message and then the identity of said other one of said station sets, and means for deriving said message from said code and for sending to said other one of said station sets for display thereat said message and the identity of said one station set.

2. The invention set forth in claim 1 wherein said arrangement further includes means for precluding the sending of said message in the event that other station set is not equipped with a display.

3. The arrangement set forth in claim 1 wherein said one station set is a station that is not equipped with a display.

4. The arrangement set forth in claim 1 wherein said request is a predetermined feature access code which is generated by a particular button on said one station set when said button is operated by said user.

5. The arrangement set forth in claim 1 including means for storing a number of messages sent to said receiving station set by other ones of said station sets.

6. An arrangement for sending a textual message from one of a plurality telephone station sets to any other one of said station sets, each of said telephone station sets having a display and being identified by respective telephone numbers, said arrangement comprising a memory, a plurality of predefined messages stored in said memory, said predefined messages being represented by respective codes, means responsive to a predetermined request from a user at said one of said station sets for returning thereto a series of signals prompting said user to enter the code of the predefined message that said user desires to send and the identity of said other one of said station sets, respectively, and means for forming into a display message the message represented by the code entered by said user and the identity of said one of said station sets and for sending said display message to said other one of said station sets for display thereat.

7. The arrangement set forth in claim 6 further including means for precluding the sending of said display message in the event that said other one of said station sets is not equipped with a display.

8. The arrangement set forth in claim 6 wherein said one of said station sets is a station not equipped with a display.

9. The arrangement set forth in claim 6 wherein said request is a predetermined feature access code which is generated by a predetermined button on said one of said station sets when said button is operated by said user.

10. The arrangement set forth in claim 6 further including means for storing a predetermined number of messages sent to said other one of said station sets by any other one of said plurality of station sets.

11. The arrangement set forth in claim 6 wherein the identity of said other one of said station sets is the identity of a respective hunt group of telephone station sets and wherein said arrangement further comprises means responsive to receipt of the identity of said other one of said station sets for causing said display message to be sent to each station set in said hunt group.

12. An arrangement for sending from one of a plurality of telephone station sets to any other one of said plurality of station sets one of a plurality of predefined textual messages represented by respective codes, each of said station sets having a display and being identified by respective telephone numbers, a group of said station sets being identified by a common telephone number, said arrangement comprising means responsive to a request entered by a user of said one station set for returning thereto a series of signals prompting said user to respectively enter the code of said one message that said user desires to send and the identity of the station set that is to receive said message, and means operative for (a) deriving said one message from the code entered by said user, (b) forming said one message and the identity of said one station set into a display message, and (c) sending to said receiving station set said display message, and wherein said display message is sent to each station set of said group of station sets when said user enters said common telephone number as the identity of said receiving station set.

* * * * *